(No Model.)
A. L. BOZARD.
PHOSPHATE DROPPER.
No. 577,613.                              Patented Feb. 23, 1897.
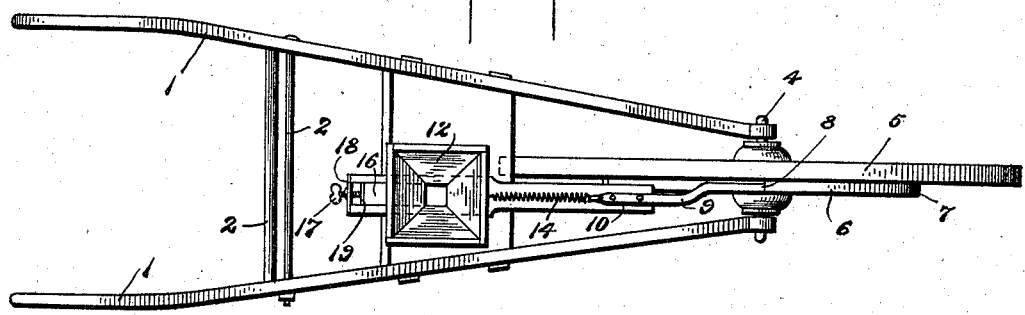
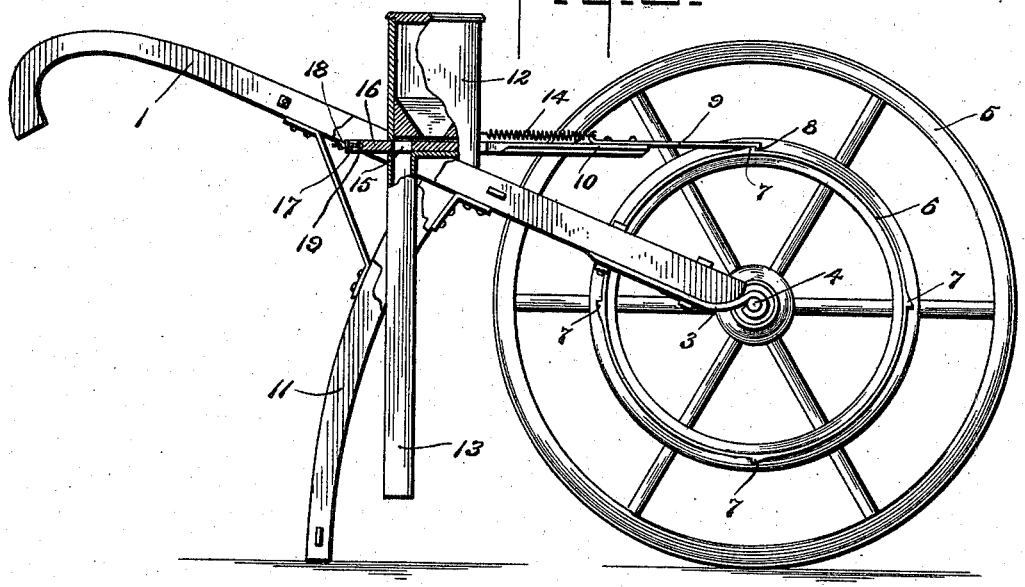
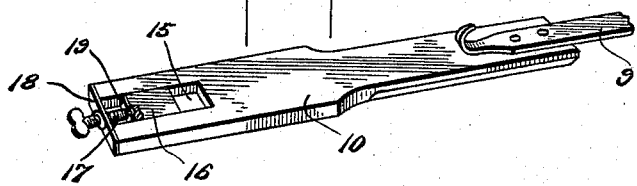
Witnesses
A. M. Poynton,
U. B. Hillyard.
Inventor
Ashbel L. Bozard,
By his Attorneys,
C. A. Snow & Co.

UNITED STATES PATENT OFFICE.

ASHBEL L. BOZARD, OF HUMPHREY, NEW YORK.

PHOSPHATE-DROPPER.

SPECIFICATION forming part of Letters Patent No. 577,613, dated February 23, 1897.

Application filed May 7, 1896. Serial No. 590,591. (No model.)

*To all whom it may concern:*

Be it known that I, ASHBEL L. BOZARD, a citizen of the United States, residing at Humphrey, in the county of Cattaraugus and State of New York, have invented a new and useful Phosphate-Dropper, of which the following is a specification.

This invention aims to provide a simple machine for dropping phosphate or other fertilizer in the hill to enrich the soil and thereby promote the growth and increase the crop.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a machine for attaining the objects of this invention. Fig. 2 is a side elevation thereof, parts being broken away. Fig. 3 is a detail view of the dropping-slide.

Corresponding and like parts are referred to in the following description and indicated in the several views of the drawings by the same reference-characters.

The handles 1 converge toward their front ends and are connected by transverse rods or bars 2, and are provided at their front ends with irons 3, which receive the ends of an axle 4, carrying a ground-wheel 5. This ground-wheel is of proper diameter and is formed on one side with a rim 6, having projections 7 at intervals in its circumferential length, said projections being beveled at one end and shouldered at the opposite end to engage with a correspondingly shouldered or bent end 8 of a draft-bar 9, attached to the dropping-slide 10. Legs 11 are secured to the handles 1 intermediate of their ends and are intended to support the handles when the implement is not in use and is at rest.

A hopper 12 is supported by means of the handles and has a discharge-opening in its bottom, the sides or walls of the hopper converging toward the discharge-opening to prevent the lodging of fertilizer in the angles. A tube or spout 13 is located below the hopper and receives the fertilizer and directs the same to the hill or furrow when the implement is in service.

The dropping-slide 10 operates beneath the bottom of the hopper and is directed in its movements in any convenient way and is returned to a normal position by means of a retractile spring 14, which is connected at one end with the hopper and at its opposite end with the slide or the draft-bar 9, the latter being hooked at its rear end for engagement therewith of the adjacent end of the said spring. The draft-bar 9 is tangentially disposed to the rim 6, and its front end is supported thereby at the point of tangency, and when engaged by the projections 7 causes the bar and dropping-slide to move forward without having any upward tendency exerted thereon. A slot 15 extends forward from the rear end of the dropping-slide and is the discharge-opening which receives the fertilizer and delivers the same to the spout or tube 13. A block 16 is adjustably mounted in the slot 15 and is moved by means of a set-screw 17, operating through a threaded opening in a plate 18, connecting the terminals of the parts of the dropping-slide separated and formed by means of the slot 15. A plate 19 is secured to the rear end of the block 16, and the set-screw 17 has swivel connection therewith, so that upon turning the set-screw the block 16 will be moved positively in either direction, so as to regulate the size of the discharge-opening in the dropping-slide, whereby the quanlity of fertilizer dropped at each operation of the slide can be regulated.

The implement is essentially a hand fertilizer-distributer and is propelled over the field by a person walking and grasping the handles 1, the machine being pushed after the fashion of a wheelbarrow or walking planter or fertilizer-distributer. As the machine moves forward, the ground-wheel 5 rotates and carries with it the rim 6, whose projections 7, engaging with the bent end of the draft-bar 9, move the dropping-slide forward against the tension of the retractile spring 14, and after the draft-bar becomes disengaged from its actuating projection the spring 14 will regain itself and return the dropping-slide to a normal position and bring the discharge-opening in register with the receiving end of the delivery tube or spout 13, which will give proper direction to the fertilizer.

Having thus described the invention, what is claimed as new is—

In a fertilizer-distributer, the combination of a hopper, a dropping-slide, a ground-wheel, a laterally-extending rim applied to a side of the ground-wheel and having projections formed thereon at intervals in its circumferential length, said projections being beveled at one end and shouldered at the opposite end, a draft-bar secured at one end to the dropping-slide and disposed tangentially to the aforesaid rim, and normally resting thereon, and having its terminal bent to engage with the projections of the said rim, and a retractile spring secured at one end to the hopper and at its opposite end to the inner bent terminal of the draft-bar, substantially as set forth.

In testimony that I claim the foregoing as my own I have hereto affixed my signature in the presence of two witnesses.

ASHBEL L. BOZARD.

Witnesses:
M. M. DYE,
W. H. DYE.